(12) United States Patent
Zhang et al.

(10) Patent No.: US 12,437,354 B2
(45) Date of Patent: Oct. 7, 2025

(54) METHOD FOR WATERMARKING DEPTH IMAGE BASED ON MIXED FREQUENCY-DOMAIN CHANNEL ATTENTION

(71) Applicant: DALIAN UNIVERSITY, Dalian (CN)

(72) Inventors: Qiang Zhang, Dalian (CN); Bin Wang, Dalian (CN); Jun Tan, Dalian (CN); Rongrong Chen, Dalian (CN); Xiaopeng Wei, Dalian (CN)

(73) Assignee: DALIAN UNIVERSITY, Liaoning (CN)

( * ) Notice: Subject to any disclaimer, the term of this patent is extended or adjusted under 35 U.S.C. 154(b) by 311 days.

(21) Appl. No.: 18/453,846

(22) Filed: Aug. 22, 2023

(65) Prior Publication Data

US 2024/0054594 A1    Feb. 15, 2024

Related U.S. Application Data

(63) Continuation of application No. PCT/CN2023/101599, filed on Jun. 21, 2023.

(30) Foreign Application Priority Data

Aug. 10, 2022    (CN) .......................... 202210955381.3

(51) Int. Cl.
*G06T 1/00*    (2006.01)
*G06T 3/40*    (2024.01)
(Continued)

(52) U.S. Cl.
CPC .............. *G06T 1/0028* (2013.01); *G06T 3/40* (2013.01); *G06V 10/764* (2022.01); *G06V 10/771* (2022.01)

(58) Field of Classification Search
CPC ....... G06T 1/0028; G06T 3/40; G06V 10/764; G06V 10/771; G06V 10/82
See application file for complete search history.

(56) References Cited

U.S. PATENT DOCUMENTS

2010/0077219 A1*   3/2010   Moskowitz ........... G06T 1/0028
                                                                    713/176

FOREIGN PATENT DOCUMENTS

| CN | 109767375 A | 5/2019 |
| CN | 111192190 A | 5/2020 |
| CN | 113158583 A | 7/2021 |

* cited by examiner

*Primary Examiner* — Christopher Wait
(74) *Attorney, Agent, or Firm* — Ming Jiang; OPENPTO US LLC

(57) ABSTRACT

The present disclosure discloses a method for watermarking depth image based on mixed frequency-domain channel attention, relating to the field of artificial neural networks and digital image watermarking; the method includes: step 1: a watermark information processor generating a watermark information feature map; step 2: an encoder generating a watermarked image from a carrier image and a watermark information feature map; step 3: a noise layer taking the watermarked image as an input, and generating a noise image through simulated differentiable noise; step 4: a decoder down-sampling the noise image to recover watermark information; step 5: a countermeasure discriminator classifying the carrier image and the watermarked image such that the encoder generates a watermarked image with a high quality. The present disclosure combines the end-to-end depth watermark model with frequency-domain channel attention to expand an application range of the depth neural network in the field of image watermark.

8 Claims, 5 Drawing Sheets

(51) Int. Cl.
*G06V 10/764* (2022.01)
*G06V 10/771* (2022.01)

FIG. 3

METHOD FOR WATERMARKING DEPTH IMAGE BASED ON MIXED FREQUENCY-DOMAIN CHANNEL ATTENTION

CROSS-REFERENCE TO RELATED APPLICATIONS

The present application claims priority to Chinese Patent Application No. 202210955381.3, entitled "METHOD FOR WATERMARKING DEPTH IMAGE BASED ON MIXED FREQUENCY-DOMAIN CHANNEL ATTENTION", filed on Aug. 10, 2022 before China National Intellectual Property Administration, the entire contents of which are incorporated herein by reference.

TECHNICAL FIELD

The present disclosure relates to the field of artificial neural networks and digital image watermarking, and in particular to a method for watermarking depth image based on mixed frequency-domain channel attention.

BACKGROUND

In recent years, with the success of depth neural network in computer vision tasks, the combination of depth neural network and digital image watermarking algorithm has become a hot direction in the field of information hiding. Not only the combination of depth neural network and digital image watermarking algorithm can protect the copyright information of images, because of the powerful learning ability of neural network, the trained watermarking algorithm model can also be applied to most image scenes. In addition, the neural network can fit the embedding and extraction of watermark information well, and make the original watermark embedding, image noise and watermark extraction participate in the training of the neural network. Compared with traditional methods in robustness and invisibility has been improved. The selection of channel features has a certain role in image watermarking, and selecting the frequency-domain components suitable for embedding watermark as the weight of channel features in the frequency-domain channel attention module can improve the performance of the watermark model. However, the current watermarked image after JPEG compression is not effective in extracting watermark, and the quality of watermarked image is poor.

SUMMARY

In order to solve the problems of poor watermarked image quality and poor watermarked image extraction after JPEG compression, the present disclosure provides a method for watermarking depth image based on mixed frequency-domain channel attention, which combines the end-to-end depth watermark model with frequency-domain channel attention to expand an application range of the depth neural network in the field of image watermark, and designs a new encoder structure with the help of frequency-domain channel attention module, and finally obtains the watermarked image with higher quality and watermark information with better decoding effect.

The technical solution adopted by the present disclosure to solve the technical problem thereof is described in the following content:

A method for watermarking depth image based on mixed frequency-domain channel attention, comprising the following steps of:
step 1: a watermark information processor generating a watermark information feature map;
step 2: an encoder generating a watermarked image from a carrier image and a watermark information feature map;
step 3: a noise layer taking the watermarked image as an input, and generating a noise image through simulated differentiable noise;
step 4: a decoder down-sampling the noise image to recover watermark information;
step 5: a countermeasure discriminator classifying the carrier image and the watermarked image such that the encoder generates a watermarked image with a high quality.

Further, step 1 is specifically that the watermark information processor takes the watermark information as an input, diffuses the watermark information to each bit of information through a full connection layer, transforms the diffused watermark information from one-dimensional feature map form to a two-dimensional feature map form, and then generates a watermark information feature map through a diffusion convolution layer and an attention module.

Further, step 2 is specifically that the encoder takes the carrier image and the watermark information feature map as an input, and generates the watermarked image through a ConvBNReLU convolution block, a mixed frequency-domain channel attention module and jump connection.

Furthermore, a mixed frequency-domain channel attention module in the encoder is composed of two branches, wherein one branch is composed of a plurality of SENet attention modules, and the SENet attention modules use a global average pooling layer in a channel compression process, namely, take a lowest frequency component in a two-dimensional discrete cosine transform as a weight allocated to a channel feature; and the other branch is composed of an FCA attention module, wherein the FCA attention module generates 64 frequency-domain components divided according to 8×8 block mode of JPEG compression principle, and selects 16 low-frequency components as compressed weights of the FCA attention module according to a zigzag mode starting from the lowest frequency component; and feature tensors generated by the branch of the FCA attention module and the branch of the SENet attention module are then spliced in a channel dimension, and a ConvBNReLU convolution module is used for feature fusion.

Further, step 4 is specifically that the decoder takes the noise image as and input, and uses the ConvBNReLU convolution module and the SENet attention module to perform down-sampling to recover the watermark information.

Further, a loss function for training the encoder includes $L_{E_1}$ and $L_{E_2}$, and $L_{E_1}$ and $L_{E_2}$ are used to assist the encoder in generating the watermarked image with a high quality, $$L_{E1}=\mathrm{MSE}(I_{CO},I_{EN})=\mathrm{MSE}(I_{CO},E(\theta_E,I_{CO},M_{EN}))$$

$$L_{E2}=\log(A(\theta_A,I_{EN}))=\log(A(\theta_A,E(\theta_E,I_{CO},M_{EN})))$$

wherein $I_{CO}$ is the carrier image, $I_{EN}$ is the watermarked image, E represents the encoder, $\theta_E$ is a parameter of the encoder E, $M_{EN}$ is the watermark information feature map; A represents a countermeasure discriminator, and $\theta_A$ is a parameter of the countermeasure discriminator A.

Further, a loss function $L_D$ for training the decoder is:

$$L_D=\text{MSE}(M,M_D)=\text{MSE}(M,D(\theta_D,I_{NO}))$$

wherein M is original watermark information, $M_D$ is decoded and recovered watermark information, D represents the decoder, $\theta_D$ is a parameter of the decoder D, and $I_{NO}$ is the noise image.

Further, a loss function $L_A$ for training the countermeasure discriminator is:

$$L_A=\log(1-A(\theta_A,E(\theta_E,I_{CO},M_{EN})+\log(A(\theta_A,I_{CO}))$$

wherein A represents the confrontation discriminator, $\theta_A$ is a parameter of the confrontation discriminator A, E represents the encoder, $\theta_E$ is a parameter of the encoder E, $I_{CO}$ is the carrier image, and $M_{EN}$ is the watermark information.

The technical solution adopted by the present disclosure has advantages compared with the prior art.

The channel attention is introduced to extract the feature of the carrier image, a plurality of frequency-domain components in the channel are used to reduce the amount of lost information in the encoding process, and 16 low-frequency components are independently selected as the weighting parameters of the channel attention, which is more robust to JPEG compression than the middle-frequency and high-frequency components.

A structure of two branches is designed. The two branches use different attentions to learn the feature map. The feature maps generated by the two branches are spliced in the channel dimension and then fused by the convolution layer so that the quality of the generated watermarked image is greatly improved.

BRIEF DESCRIPTION OF DRAWINGS

FIG. 3 is a schematic diagram of selection of frequency-domain components;

DETAILED DESCRIPTION OF THE EMBODIMENTS

The technical solution of the present disclosure will now be described more clearly and fully hereinafter with reference to the accompanying drawings, in which embodiments of the disclosure are shown. It is to be understood that the embodiments described are only a few, but not all embodiments of the disclosure. Based on the embodiments of the present disclosure, all other embodiments obtained by a person of ordinary skill in the art without inventive effort fall within the scope of the present disclosure.

Figure 1:
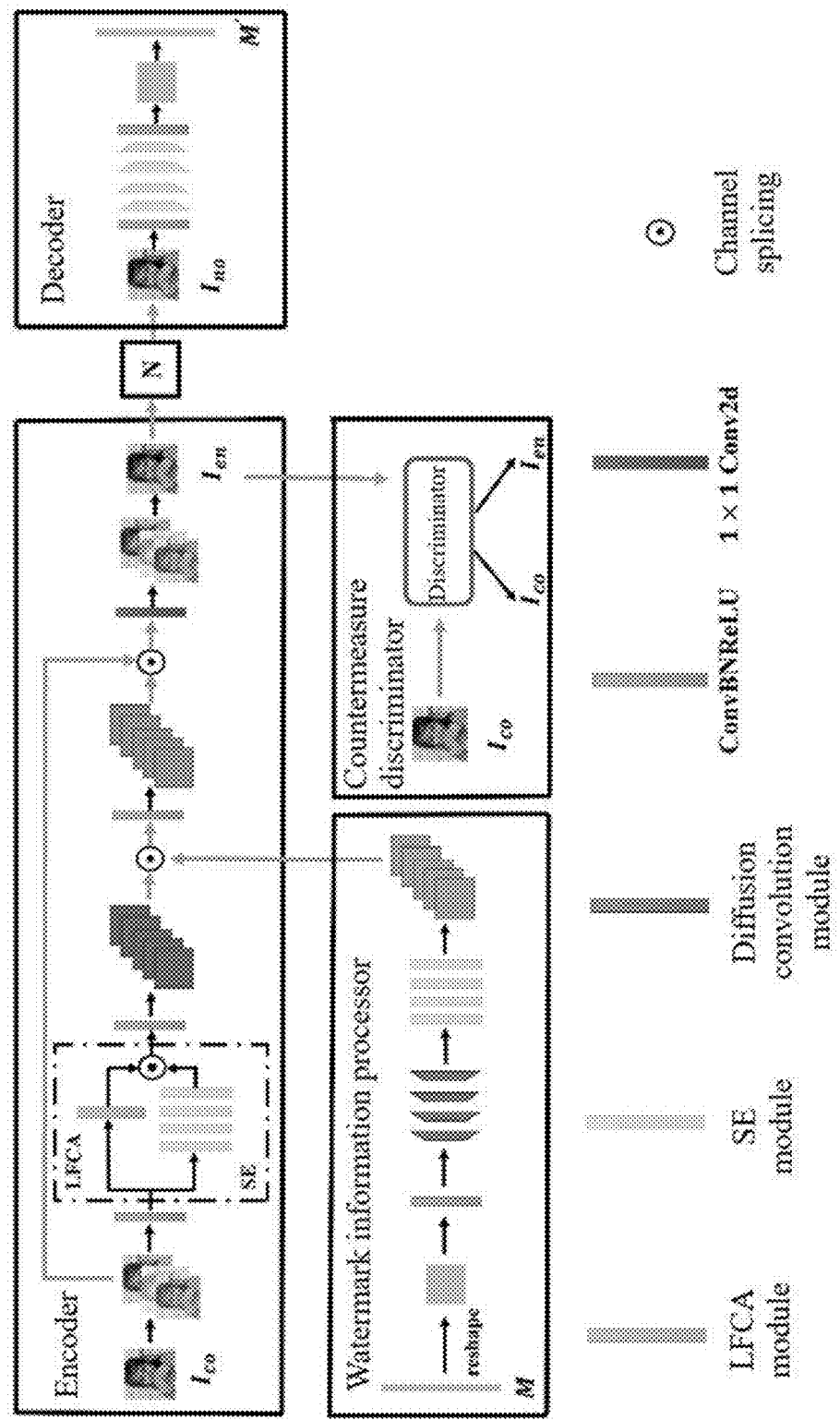
FIG. 1 is a diagram of an overall method network model architecture of the present disclosure.

FIG. 1 is a diagram of an overall method network model architecture of the present disclosure. A method for watermarking depth image based on mixed frequency-domain channel attention includes that:

S1: the watermark information processor takes the watermark information as an input, diffuses the watermark information to each bit of information through a full connection layer, transforms the diffused watermark information from one-dimensional feature map form to a two-dimensional feature map form, and then generates a watermark information feature map through a diffusion convolution layer and an attention module.

S2: the encoder takes the carrier image and the watermark information feature map as an input, and generates the watermarked image through a ConvBNReLU convolution block, a mixed frequency-domain channel attention module and jump connection, wherein a mixed frequency-domain channel attention module in the encoder is composed of two branches. One branch is composed of a plurality of SE attention modules, and the SE attention modules take a lowest frequency component in a discrete cosine transform domain as a weight parameter; and the other branch selects 16 low-frequency components as weight parameters according to a zigzag mode of 8×8 block.

Figure 2:
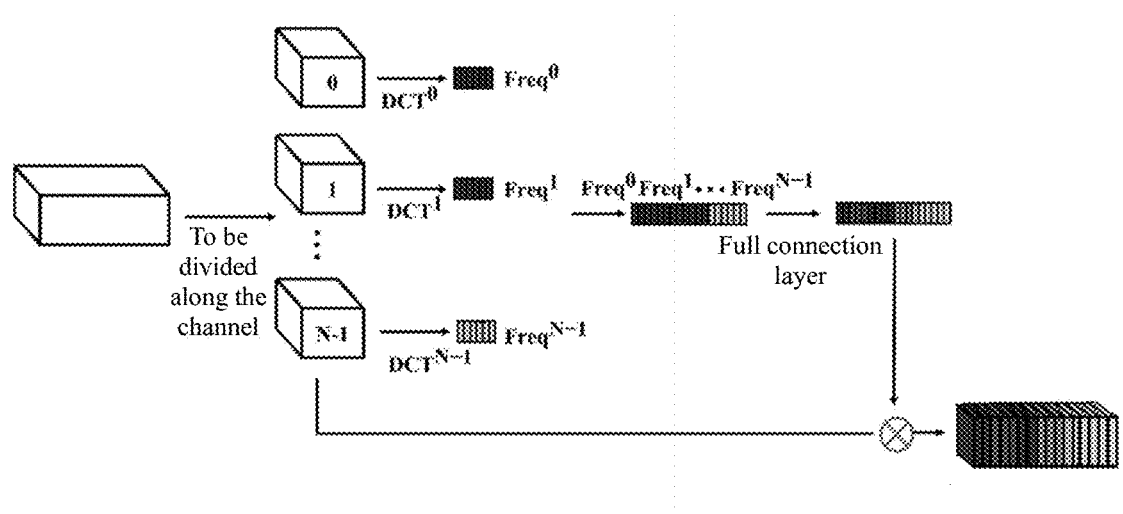
FIG. 2 is a diagram of a principle of a frequency-domain channel attention.
Figure 3:
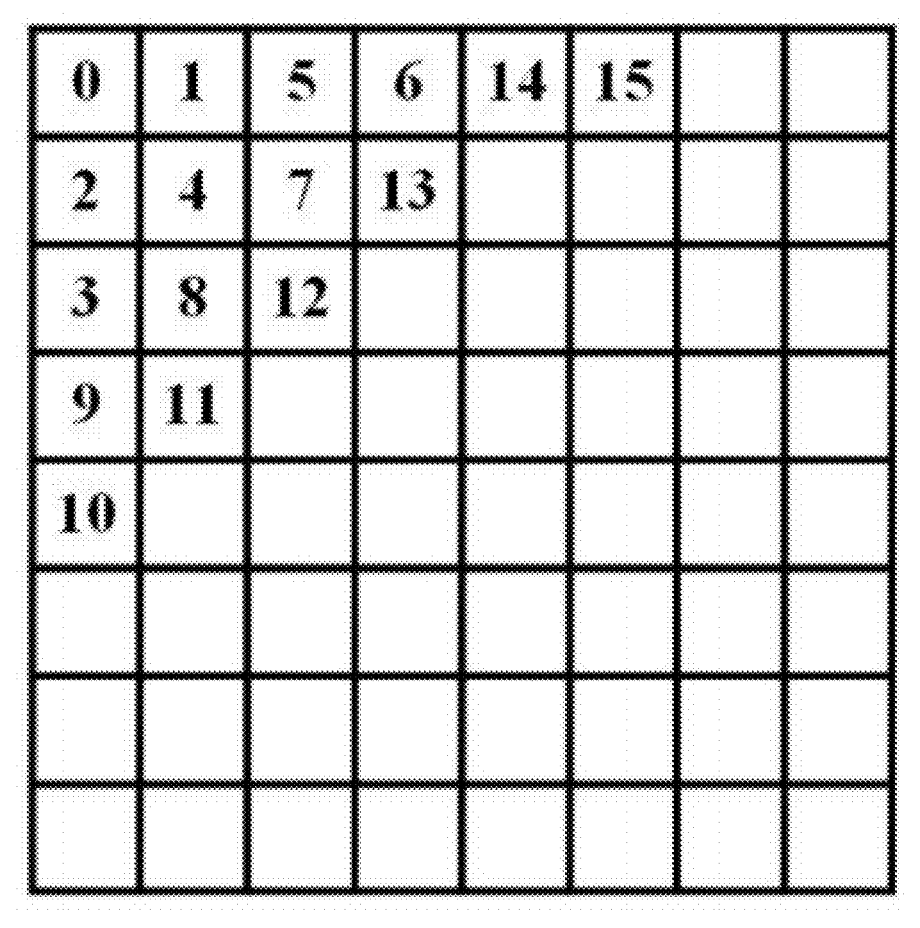

FIG. 2 is a diagram of a principle of a frequency-domain channel attention. Specifically, the specific structure of the mixed frequency-domain channel attention module in the encoder is designed as two branches, wherein one branch is composed of a plurality of SENet attention modules, and the other branch is composed of an FCA attention module; the SENet uses a global average pooling layer in a channel compression process, namely, take the lowest frequency component in a two-dimensional discrete cosine transform as a weight allocated to a channel feature, while the FCA attention module modifies the global average pooling layer according to the above-mentioned principle, and a plurality of components of the two-dimensional discrete cosine transform can be selected; according to the 8×8 block mode of the JPEG compression principle, 64 frequency-domain components are divided, and 16 low-frequency components are selected as the compressed weights of the FCA attention module according to a zigzag mode starting from the lowest frequency component, and then the feature tensors generated by the FCA attention module branch and the SENet attention module branch on the channel dimension are concatenated, and a ConvBNReLU convolution module is used to perform feature fusion. The $DCT^N$ in FIG. 2 refers to a block discrete cosine transform; $Freq^N$ refers to frequency components. FIG. 3 is a schematic diagram of selection of frequency-domain components.

S3: the noise layer uses the watermarked image as an input to generate a noisy image via simulated differentiable noise; in a training process of the model, for each batch of input watermarked images, the noise layer randomly selects one of set noises for distortion to simulate a noise environment in a real scene.

S4: the decoder takes the noise image as and input, and uses the ConvBNReLU convolution block and the SENet attention module to perform down-sampling to recover the watermark information.

S5: the confrontation discriminator classifies the carrier image and the watermarked image to help the encoder generate a watermarked image with a higher quality. The confrontation discriminator is composed of a plurality of ConvBNReLU modules with convolution kernel size of 3×3 and a global average pooling layer.

The foregoing content is described in detail in the following text.

The watermark information processor is mainly responsible for processing the watermark information and inputting a processed feature map into the encoder. It receives a binary watermark information of length L composed of zeros and ones and outputs a watermark information feature map of size C'×H×W, where C' is the quantity of channels of the feature map. H is a height of the feature map and W is a width of the feature map, and in particular, a randomly generated feature map with a length L of which the watermark information changes from one dimension to two dimensions has a size of $\{0,1\}^{1 \times h \times w}$, where L=h×w. It is then amplified by a convolution module ConvBNReLU consisting of a convolution layer with a convolution kernel size of 3×3, a batch normalization layer and an activation function ReLU, and its size is extended to C×H×W by several diffuse convolution layers. Finally, in order to expand the information more appropriately, the feature map of the watermark information is extracted by several SE attention modules.

The encoder E with parameter $\theta_E$ takes as inputs the RGB color image of size 3×H×W, i.e. the carrier image $I_{CO}$ and the watermark information feature map $M_{EN}$, and outputs an encoded image of size 3×H×W, i.e. the watermarked image $I_{EN}$. To better select the channel features, the encoder uses a mixed frequency channel attention module comprising a plurality of SE channel attention modules and a FCA frequency-domain channel attention module. The principle for the FCA attention module to select multi-frequency components is:

$$b_{u,v}^{i,j} = \cos\left(\frac{\pi u}{H}\left(i+\frac{1}{2}\right)\right)\cos\left(\frac{\pi v}{W}\left(j+\frac{1}{2}\right)\right);$$

$$F_{u,v}^{2d} = \sum_{i=0}^{H-1}\sum_{j=0}^{W-1} x_{i,j}^{2d} b_{u,v}^{i,j};$$

where $b_{u,v}^{i,j}$ is a basis function of the discrete cosine transform, which removes some constant coefficients and does not affect the result, $x^{2d}$ is taken as an input of the discrete cosine transform, H is a height of $x^{2d}$, W is a width of $x^{2d}$, and u∈{0, 1, ..., H)1}, v∈{0, 1, ..., W)1}. The global average pooling operation is actually equivalent to the discrete cosine transform values when u=0 and v=0, i.e. the lowest frequency component:

$$F_{0,0}^{2d} = \sum_{i=0}^{H-1}\sum_{j=0}^{W-1} x_{i,j}^{2d} \cos\left(\frac{0}{H}\left(i+\frac{1}{2}\right)\right)\cos\left(\frac{0}{W}\left(j+\frac{1}{2}\right)\right) = \text{gap}(x^{2d})HW$$

The whole encoder consists of a plurality of ConvBN-ReLU convolution blocks with a convolution kernel size of 3×3, a mixed frequency channel attention module and a convolution layer with a convolution kernel size of 1×1. In the first step, it first magnifies the carrier image through the ConvBNReLU convolution block with convolution kernel size of 3×3, then uses the proposed mixed frequency channel attention module to ensure a invariant feature map size, and uses the ConvBNReLU convolution block with convolution kernel size of 3×3 to gather the feature maps obtained by the attention module. In the second step the watermark information feature map obtained from the watermark information processor and the previously output carrier image and feature map obtained by the mixed frequency channel attention module are input into the ConvBNReLU convolution block with a convolution kernel size of 3×3 for feature fusion. In the third step, the fused feature map and the carrier image transferred by the jump join are spliced into a new feature map, and are sent to a convolution layer with a convolution kernel size of 1×1 to obtain a coded image IEN. The encoder is trained to minimize the L2 distance between $I_{CO}$ and $I_{EN}$ by updating the parameter $\theta_E$:

$$L_{E1} = \text{MSE}(I_{CO}, I_{EN}) = \text{MSE}(I_{CO}, E(\theta_E, I_{CO}, M_{EN}))$$

The robustness of the overall model is provided by the noise layer. The noise in the noise layer is selected from a specified noise pool, which takes as input the coded image $I_{EN}$ and outputs a noise image $I_{NO}$ of the same size. In a training process of the model, for each batch of input encoded images, the noise layer randomly selects one of set noises for distortion to simulate a noise environment in a real scene.

The task of the decoder D with the parameter $\theta_D$ is to recover the watermark information $M_D$ of length L from the noise image $I_{NO}$, which part determines the ability of the whole model to extract the watermark. In the decoding stage, the noise image $I_{NO}$ is input to a ConvBNReLU layer with a convolution kernel size of 3×3 and the obtained feature map is downsampled by a number of SE attention modules. Then, the multi-channel tensor is converted into a single-channel tensor through a convolution layer with a convolution kernel size of 3×3, and a shape of the single-channel tensor is changed to obtain decoded watermark information $M_D$. The goal of training the decoder is to minimize the L2 distance between the original watermark information M and $M_D$ by updating the parameter $\theta_D$:

$$L_D = \text{MSE}(M, M_D) = \text{MSE}(M, D(\theta_D, I_{NO}))$$

since it plays an important role in a bit error rate index, the loss function $L_D$ occupies the largest proportion of the total loss function.

the confrontation discriminator A is composed of a plurality of ConvBNReLU modules with convolution kernel size of 3×3 and a global average pooling layer. Under the influence of the counter network, the encoder will deceive the opponent as much as possible, so that the opponent discriminator cannot make the correct judgment on $I_{CO}$ and $I_{EN}$, and update the parameter $\theta_E$ to minimize the loss function $L_{E2}$, so as to improve the encoding quality of the encoder:

$$L_{E2} = \log(A(\theta_A, I_{EN})) = \log(A(\theta_A, E(\theta_E, I_{CO}, M_{EN})))$$

the discriminator with parameter $\theta_A$ needs to distinguish $I_{CO}$ from $I_{EN}$ as a binary classifier. The goal of an adversary is to minimize the classification loss $L_A$ by updating $\theta_A$:

$$L_A = \log(1-A(\theta_A, E(\theta_E, I_{CO}, M_{EN}))) + \log(A(\theta_A, I_{CO}))$$

The total loss function is $L = \lambda_E L_{E1} + \lambda_D L_D + \lambda_A L_{E2}$, and $L_A$ is the loss function for the countermeasure discriminator. $\lambda_E$, $\lambda_D$ and $\lambda_A$ are the weight parameters of the respective loss functions, set to 1, 10 and 0.0001 in the training, respectively.

The above-mentioned design for a loss function is embodied in that the loss function is specifically two parts, one part being a loss function for the encoder and the decoder $L_{E_1}$, LD and $L_{E_2}$, wherein the $L_{E_1}$ and $L_{E_2}$ are used for assisting the encoder to generate the watermarked image with a high quality, $L_{E_1}$ uses an L2 loss to make a carrier image and a watermarked image visually as similar as possible, and $L_{E_2}$ is a loss assisting encoder generated by a counter discriminator; and the other part is the loss function $L_A$ for training the discriminator.

Example 1

Figure 4:
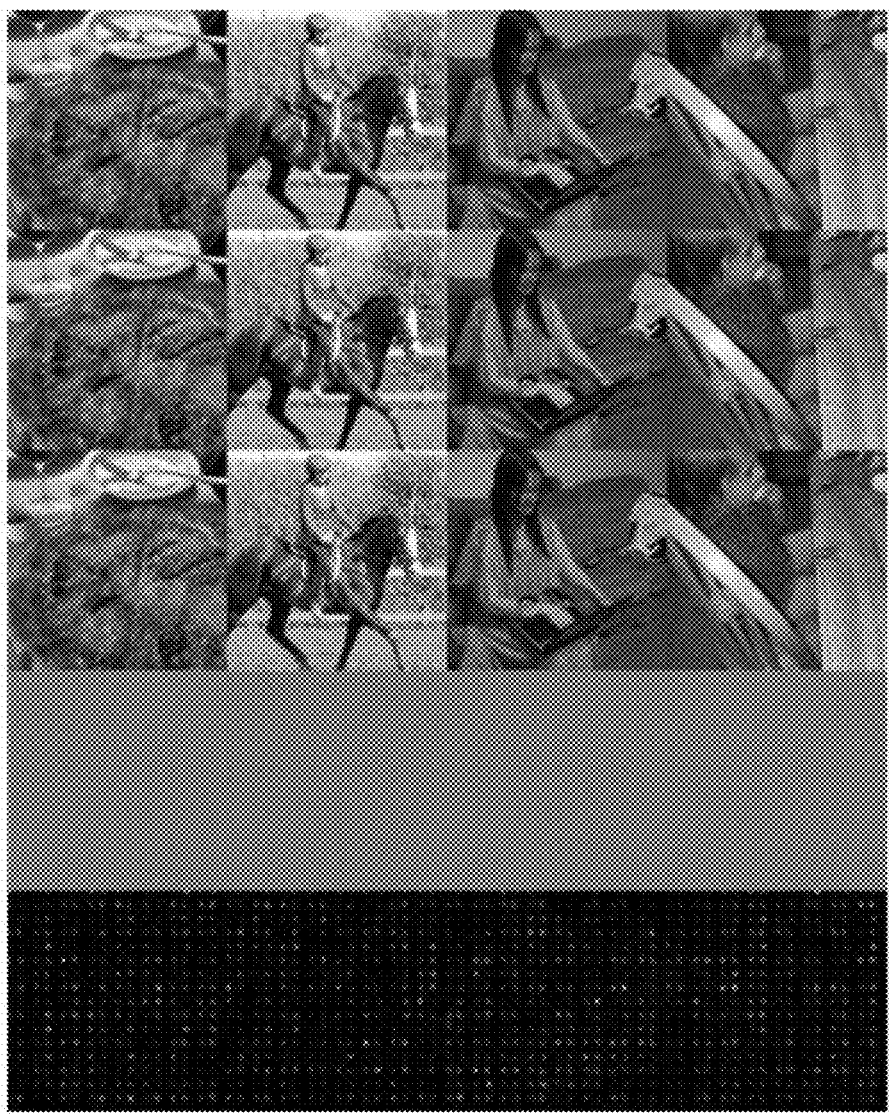
FIG. 4 is a diagram of test results after specialized training for JPEG compression for noise.

In order to reflect the universality of this model, it is feasible to randomly select 10000 images from the image data set of ImageNet as the training set of model, and then randomly select 5000 images from the image data set of COCO as the verification set and 5000 images as the test set. Before the the input model training, the data set is preprocessed and cut to the size of 128×128, the batch size is set as 16, and the training run is set as 150. A dynamic Adam is selected for the optimization algorithm during training and a learning rate of 0.001 is set. For the test of JPEG compression noise, it is feasible to use the library function provided in PIL. During training, an embedding strength of the watermark information is set to 1. In order to measure the performance of the watermark algorithm, PSNR and SSIM are used to calculate the similarity between the carrier image and the watermarked image to represent the imperceptibility of the watermarking algorithm, and the error rate between the watermark information and the watermark information recovered by the decoder is used to represent the robustness of the watermarking algorithm. FIG. 4 is a diagram of test results after specialized training for JPEG compression for noise.

Other methods are used for the test experiment under the training of JPEG compression noise. See Table 1 for the relevant data.

TABLE 1

Test experiments of other methods under JPEG compression noise training

| model | Hidden | TSDL | MBRS | The present disclosure |
|---|---|---|---|---|
| Image size | 128 × 128 | 128 × 128 | 128 × 128 | 128 × 128 |
| Information length | 30 | 30 | 64 | 64 |
| Noise layer | JPEG-Mask | JPEG | Mixed | Mixed |
| PSNR | 30.09 | 33.51 | 36.49 | 38.13 |
| SSIM | | | 0.9173 | 0.9472 |
| BER | 15% | 22.3% | 0.0092% | 0.0078% |

The settings of the single noise model and the mixed noise model are trained. The single noise model means that the noise layer only includes one kind of noise, and the trained watermark model only has strong robustness to the noise. Taking JPEG compression as an example, the setting of the noise layer is no noise, simulated JPEG-Mask and real JPEG compression. The reason for this selection is that the real JPEG compression is non-differentiable noise, and the model parameters fed back can not be added to the training of the model, while the simulated JPEG-Mask is only a JPEG compression template manually set which can not achieve the effect of the real JPEG compression, so the noise-free, JPEG-Mask and real JPEG compression are selected for hybrid training to maximize the simulation of real JPEG compression, and the intensity factor of JPEG compression is set as 50.

Figure 5:
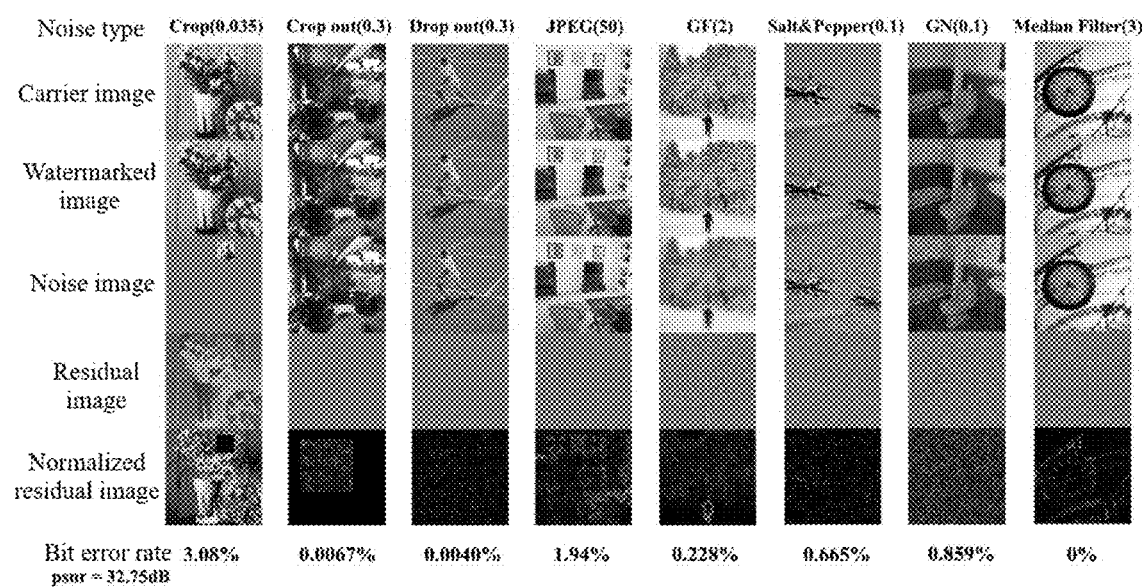
FIG. 5 shows experimental results under various noise tests after training for mixed noise.

FIG. 5 shows experimental results under various noise tests after training for mixed noise. The mixed noise model sets a variety of noises in the noise layer, so that the trained model can achieve better robustness for most noises. This embodiment provides a mixed noise model training set, wherein the noise layer is set as JPEG (Q=50), JPEG-Mask (Q=50), no noise and Crop (p=0.0225). Note that when geometric noise similar to cropping is included in the noise layer, the watermark information processor firstly diffuses the watermark information through a full connection layer and also adds a full connection layer at the end of the decoder to perform inverse transformation. Table 2 shows test experiments for various noise and other methods under mixed noise training.

Selection of weights. The preset number of training rounds is 150, and after the training is completed, several training rounds corresponding to minimum values are selected from the recorded training logs according to the total loss of the verification set as the weights to be introduced into the model by the test.

TABLE 2 test experiments for various noise and other methods under mixed noise training

| Noise | Identity | Crop out (0.3) | Drop out (0.3) | Crop (0.035) | GF (2) | JPEG (50) |
|---|---|---|---|---|---|---|
| Hidden | 0% | 6% | 7% | 12% | 4% | 37% |
| TSDL | 0% | 2.7% | 2.6% | 11% | 1.4% | 23.8% |
| MBRS | 0% | 0.0027% | 0.0087% | 4.15% | 0.011% | 4.48% |
| Ours | 0% | 0.0013% | 0.008% | 3.24% | 0.293% | 2.61% |

Methods for Testing. It is emphasized in the test that the watermarked image in the training process is different from that in the test process. In the training process, the watermarked image generated by the encoder is directly input into the noise layer to participate in the whole training, and in the testing process, the weight parameters of the watermark information processor, the encoder and the decoder are fixed; the difference value $I_{diff}$ between the carrier image and the watermarked image generated by the encoder represents the watermark information; the $I_{diff}$ is multiplied by the watermark embedding strength $\alpha$ and then added to the carrier image in the pixel dimension to generate a watermarked image for testing, namely, $I_{EN}=I_{CO}+\alpha \times I_{diff}=I_{CO}+\alpha \times (I_{EN}-I_{CO})$; and in the training process, since the intensity factor $\alpha$ is 1, the intensity factor can be adjusted during testing to balance robustness and invisibility for different applications. After the parameters of the test are set, the training weights selected before are introduced into the test, and the results of images in the test set are averaged to represent the overall performance of the test.

Table 3 shows the results of comparing the encoded image quality after a single training for each noise, with the intensity factor adjusted so that the bit error rate approaches 0%.

TABLE 3

Results of encoded image quality

| Measurement | Model | Crop (0.035) | Cropout (0.3) | Dropout (0.3) | GF (2) | Identity |
|---|---|---|---|---|---|---|
| PSNR | Hidden | 35.20 | 47.24 | 42.52 | 40.55 | 44.63 |
| | MBRS | 32.15 | 46.77 | 48.50 | 40.74 | 42.81 |
| | The present disclosure | 33.01 | 4.26 | 49.43 | 42.30 | 45.71 |
| SSIM | Hidden | — | — | — | — | — |
| | MBRS | 0.7872 | 0.9910 | 0.9936 | 0.9670 | 0.9740 |
| | The present disclosure | 0.8225 | 0.9924 | 0.9945 | 0.9760 | 0.9867 |

TABLE 3-continued

Results of encoded image quality

| Measurement | Model | Crop (0.035) | Cropout (0.3) | Dropout (0.3) | GF (2) | Identity |
|---|---|---|---|---|---|---|
| BER | Hidden | 0% | 3% | 0% | 0% | 0% |
| | MBRS | 0.72% | 0% | 0% | 0% | 0% |
| | The present disclosure | 0.29% | 0% | 0% | 0% | 0% |

Table 4 shows the results of tests at different quality factors and different intensity factors after training specifically for JPEG compression for noise.

TABLE 4

Results of tests at different quality factors and different intensity factors

| | | strength factor | | | | | |
|---|---|---|---|---|---|---|---|
| | | 0.4 | 0.6 | 0.8 | 1.0 | 1.2 | 1.4 |
| BER | Q = 10 | 35.03% | 27.91% | 21.80% | 16.86% | 13.02% | 10.06% |
| | Q = 30 | 15.65% | 5.94% | 1.63% | 0.33% | 0.047% | 0.0053% |
| | Q = 50 | 7.74% | 1.11% | 0.0078% | 0.0050% | 0.0012% | 0% |
| | Q = 70 | 3.87% | 0.370% | 0.0170% | 0.0008% | 0% | 0% |
| | Q = 90 | 2.53% | 0.020% | 0.0078% | 0.0006% | 0% | 0% |
| PSNR | | 45.92 | 42.40 | 39.89 | 37.95 | 36.87 | 35.30 |
| SSIM | | 0.9893 | 0.9773 | 0.9623 | 0.9455 | 0.9274 | 0.9086 |

It is to be understood that the above-described embodiments are merely illustrative for clarity and are not restrictive of the embodiments. It will be apparent to those skilled in the art that various other modifications and variations can be made in the present disclosure without departing from the scope or spirit of the disclosure. All embodiments need not be, and cannot be, exhaustive. Obvious modifications or variations are possible in light of the above-mentioned teachings.

What is claimed is:

1. A method for watermarking depth image based on mixed frequency-domain channel attention, comprising the following steps of:
   step 1: a watermark information processor generating a watermark information feature map;
   step 2: an encoder generating a watermarked image from a carrier image and a watermark information feature map;
   step 3: a noise layer taking the watermarked image as an input, and generating a noise image through simulated differentiable noise;
   step 4: a decoder down-sampling the noise image to recover watermark information;
   step 5: a countermeasure discriminator classifying the carrier image and the watermarked image such that the encoder generates a watermarked image with a high quality.

2. The method for watermarking depth image based on mixed frequency-domain channel attention according to claim 1, wherein step 1 is specifically that the watermark information processor takes the watermark information as an input, diffuses the watermark information to each bit of information through a full connection layer, transforms the diffused watermark information from one-dimensional feature map form to a two-dimensional feature map form, and then generates a watermark information feature map through a diffusion convolution layer and an attention module.

3. The method for watermarking depth image based on mixed frequency-domain channel attention according to claim 2, wherein step 2 is specifically that the encoder takes the carrier image and the watermark information feature map as an input, and generates the watermarked image through a ConvBNReLU convolution block, a mixed frequency-domain channel attention module and jump connection.

4. The method for watermarking depth image based on mixed frequency-domain channel attention according to claim 3, wherein a mixed frequency-domain channel attention module in the encoder is composed of two branches, wherein one branch is composed of a plurality of SENet attention modules, and the SENet attention modules use a global average pooling layer in a channel compression process, namely, take a lowest frequency component in a two-dimensional discrete cosine transform as a weight allocated to a channel feature; and the other branch is composed of an FCA attention module, wherein the FCA attention module generates 64 frequency-domain components divided according to 8×8 block mode of JPEG compression principle, and selects 16 low-frequency components as compressed weights of the FCA attention module according to a zigzag mode starting from the lowest frequency component; and feature tensors generated by the branch of the FCA attention module and the branch of the SENet attention module are then subjected to jump connection in a channel dimension, and a ConvBNReLU convolution module is used for feature fusion.

5. The method for watermarking depth image based on mixed frequency-domain channel attention according to claim 4, wherein step 4 is specifically that the decoder takes the noise image as and input, and uses the ConvBNReLU convolution module and the SENet attention module to perform down-sampling to recover the watermark information.

6. The method for watermarking depth image based on mixed frequency-domain channel attention according to claim 4, wherein a loss function for training the encoder includes $L_{E_1}$ and $L_{E_2}$, and $L_{E_1}$ and $L_{E_2}$ are used to assist the encoder in generating the watermarked image with a high quality, $$L_{E_1}=\mathrm{MSE}(I_{CO},I_{EN})=\mathrm{MSE}(I_{CO},E(\theta_E,I_{CO},M_{EN}))$$

$$L_{E_2}=\log(A(\theta_A,I_{EN}))=\log(A(\theta_A,E(\theta_E,I_{CO},M_{EN})))$$

wherein $I_{CO}$ is the carrier image, $I_{EN}$ is the watermarked image, E represents the encoder, $\theta_E$ is a parameter of the encoder E, $M_{EN}$ is the watermark information feature map; A represents a countermeasure discriminator, and $\theta_A$ is a parameter of the countermeasure discriminator A.

7. The method for watermarking depth image based on mixed frequency-domain channel attention according to claim 5, wherein the loss function $L_D$ for training the decoder is:

$$L_D=\mathrm{MSE}(M,M_D)=\mathrm{MSE}(M,D(\theta_D,I_{NO}))$$

wherein M is original watermark information, $M_D$ is decoded and recovered watermark information, D represents the decoder, $\theta_D$ is a parameter of the decoder D, and $I_{NO}$ is the noise image.

8. The method for watermarking depth image based on mixed frequency-domain channel attention according to claim 6, wherein the loss function $L_A$ for training the countermeasure discriminator is:

$$L_A=\log(1-A(\theta_A,E(\theta_E,I_{CO},M_{EN})))+\log(A(\theta_A,I_{CO}))$$

wherein A represents the confrontation discriminator, $\theta_A$ is a parameter of the confrontation discriminator A, E represents the encoder, $\theta_E$ is a parameter of the encoder E, $I_{CO}$ is the carrier image, and $M_{EN}$ is the watermark information.

* * * * *